(12) United States Patent
Schmidt (10) Patent No.: US 11,997,339 B2
(45) Date of Patent: May 28, 2024

(54) ADAPTIVE STREAMING OF MEDIA CONTENT WITH BITRATE SWITCHING

(71) Applicant: Dolby International AB, Amsterdam (NL)

(72) Inventor: Malte Schmidt, Feucht (DE)

(73) Assignee: Dolby International AB, Amsterdam (NL)

( * ) Notice: Subject to any disclaimer, the term of this patent is extended or adjusted under 35 U.S.C. 154(b) by 0 days.

(21) Appl. No.: 17/792,829

(22) PCT Filed: Jan. 12, 2021

(86) PCT No.: PCT/EP2021/050445
§ 371 (c)(1),
(2) Date: Jul. 14, 2022

(87) PCT Pub. No.: WO2021/144244
PCT Pub. Date: Jul. 22, 2021

(65) Prior Publication Data
US 2023/0052666 A1    Feb. 16, 2023

Related U.S. Application Data

(60) Provisional application No. 62/961,257, filed on Jan. 15, 2020.

(30) Foreign Application Priority Data

Jan. 15, 2020  (EP) .................................. 20151982

(51) Int. Cl.
    *H04N 21/2662*    (2011.01)
(52) U.S. Cl.
    CPC .............................. *H04N 21/2662* (2013.01)

(58) Field of Classification Search
None
See application file for complete search history.

(56) References Cited

U.S. PATENT DOCUMENTS

2003/0067872 A1    4/2003  Harrell
2005/0055204 A1    3/2005  Florencio et al.
(Continued)

FOREIGN PATENT DOCUMENTS

CN    1475010 A    2/2004
CN    1601912 A    3/2005
(Continued)

OTHER PUBLICATIONS

Jin Xin, The Research and Application of Adaption Method for DASH-based Mobile Streaming, Oct. 2016, 82 pages, College of Computer Science and Technology Zhejiang University of Technology, Zhejiang, CN.

(Continued)

*Primary Examiner* — William J Kim (57) ABSTRACT

A method for adaptive streaming of media content with bitrate switching is described, wherein the media content comprising a plurality of consecutive media segments. The method comprising, at a media streaming server: transmitting a segment of the media content encoded in a first coding mode having a first bitrate; receiving an indication for a coding mode switch to a second coding mode having a second bitrate and in response transmitting a transition segment for transitioning between the first coding mode and the second coding mode; and transmitting another segment of the media content encoded in the second coding mode.

15 Claims, 5 Drawing Sheets

(56) References Cited

U.S. PATENT DOCUMENTS

| | | | |
|---|---|---|---|
| 2006/0139448 A1* | 6/2006 | Ha | H04N 13/305 348/E13.043 |
| 2010/0118938 A1 | 5/2010 | Fuchs | |
| 2010/0215347 A1* | 8/2010 | Ikeda | H04N 13/161 386/212 |
| 2010/0226628 A1* | 9/2010 | Yamaji | H04N 9/8227 386/353 |
| 2011/0176496 A1 | 7/2011 | Roy | |
| 2013/0282917 A1 | 10/2013 | Reznik | |
| 2016/0269711 A1* | 9/2016 | Hwang | H04N 13/161 |
| 2016/0294915 A1 | 10/2016 | George | |
| 2018/0109468 A1 | 4/2018 | Sridhar | |
| 2019/0014363 A1 | 1/2019 | Skupin | |
| 2019/0045220 A1 | 2/2019 | Braness | |
| 2019/0356928 A1 | 11/2019 | Braness | |

FOREIGN PATENT DOCUMENTS

| | | |
|---|---|---|
| CN | 101601280 A | 12/2009 |
| CN | 102217272 A | 10/2011 |
| CN | 102740159 A | 10/2012 |
| CN | 102883152 A | 1/2013 |
| CN | 104509119 A | 4/2015 |
| CN | 105359544 A | 2/2016 |
| CN | 105453582 A | 3/2016 |
| CN | 106664437 A | 5/2017 |
| CN | 108650510 A | 10/2018 |
| EP | 2785068 B1 | 1/2020 |
| WO | 0241302 A1 | 5/2002 |
| WO | 2018185769 A1 | 10/2018 |

OTHER PUBLICATIONS

Khaled Diab, et al., MASH: A Rate Adaptation Algorithm for Multiview Video Streaming over HTTP, IEEE INFOCOM 2017—IEEE Conference on Computer Communications, 2017, pp. 1-9, 10 pages, Atlanta, GA, USA.

* cited by examiner

ADAPTIVE STREAMING OF MEDIA CONTENT WITH BITRATE SWITCHING

CROSS-REFERENCE TO RELATED APPLICATIONS

This application claims priority of the following priority applications: U.S. provisional application 62/961,257 (reference: D19012USP1), filed 15 Jan. 2020 and EP application 20151982.4 (reference: D19012EP), filed 15 Jan. 2020, which are hereby incorporated by reference.

TECHNICAL FIELD

The present document relates to adaptively streaming media content from a media streaming server to a client device, for example to a media playback device, wherein the media content can be streamed with different bitrates, and the client device requests a coding mode switch to change the bitrate.

BACKGROUND

Various server-client paradigms allow streaming audio and/or video media content from a media streaming server to a media playback device by using different bitrates.

For example, Dynamic Adaptive Streaming over HTTP (DASH), also known as MPEG-DASH, is an adaptive bitrate streaming technique that enables high quality streaming of media content over the Internet delivered from conventional HTTP web servers. Similar to the HTTP Live Streaming (HLS) solution, MPEG-DASH works by breaking the media content into a sequence of small HTTP-based file segments, each segment containing an interval of playback time of the media content, such as a movie or the live broadcast of a sports event. The media content is made available at a variety of different bitrates, i.e., alternative segments encoded at different bitrates covering aligned short intervals of playback time. While the content is being played back by an MPEG-DASH client, the client can use a bitrate adaptation algorithm to automatically select the segment with the highest bitrate possible that can be downloaded in time for playback without causing stalls or re-buffering events in the playback.

In other words, adaptive streaming of media content allows switching between media content segments having different bitrates, for example to adapt to changing network conditions and provide high quality playback with fewer stalls or re-buffering events. However, switching between different bitrates may require different coding of audio or video signal and undesired effects perceivable at the receiver end may occur when switching between these different encodings. Examples for these effects are glitches or other unnatural transitions in the streamed media content, impeding the user experience.

BRIEF SUMMARY OF THE INVENTION

According to an aspect, a method for adaptive streaming of media content with bitrate switching is described. The media content comprises a plurality of consecutive media segments and, at a media streaming server, the method comprises transmitting a segment of the media content encoded in a first coding mode having a first bitrate. In some embodiments, the media content can be transmitted to a client device, wherein the client device can represent a media playback device configured to receive and playback the media content. The media segments may be transmitted from the server to the client device in response to respective media content requests from the client device. For example, the requests may be HTTP requests such as HTTP get requests for particular media segments (e.g. according to MPEG-DASH). The media content requests may specify the requested media segment (e.g. via an identifier of the segment) and the coding mode of the requested media segment. However, the present disclosure is not limited to HTTP requests and can be applied to other techniques for transmitting media segments from a server to a client device.

The method further comprises receiving from the client device a request or an indication for a coding mode switch to a second coding mode having a second bitrate. For example, as mentioned above, the client device may desire to change the bitrate of the received media content to adapt to changing network conditions, for example to maintain high quality playback with fewer stalls or re-buffering events. The media streaming server and the client device may communicate through a communications network such as the Internet, using appropriate protocols. Further, the client device may have access to only limited bandwidth in the network which needs to be shared with other users, and a change in bandwidth availability may require or allow a change in the received bitrate, causing the client device to issue the respective request. For example, in case of reduced network bandwidth availability, a reduction of the bitrate for the media stream (with reduced quality) may be necessary to maintain a steady transmission of the media content. Vice versa, if the client device determines that the network conditions have changed and a higher bitrate is possible, a coding mode with a better quality may be selected. In these cases, the client device may have the desire to adaptively switch to a different coding mode having a different bitrate.

At the media streaming server end, upon receiving from the client device the request or indication for a coding mode switch to a second coding mode having a second bitrate, a transition segment is transmitted for transitioning between the first coding mode and the second coding mode. The indication or request for a coding mode switch may be explicit, e.g. a message where the client device informs the server about the intended change from coding mode A to coding mode B. Alternatively, the indication for a coding mode switch may be implicit, e.g. the client device requesting a transition segment for a next media segment in which the coding mode for the respective media segment gradually changes from coding mode A to coding mode B. In embodiments, the request for a transition segment is a HTTP request e.g. according to MPEG-DASH.

In this way, rather than simply switching between segments representing the media content encoded in the first coding mode and the media content encoded in the second coding mode, respectively, the client device receives a transition segment allowing the client device to smoothly transition between the media content encoded in the two different coding modes.

Then, after transmitting the transition segment, a segment of the media content encoded in the second coding mode is transmitted (e.g. in response to a respective request from the client device), i.e. after the above transition between the two different coding modes provided by the transition segment has been completed.

In some embodiments, the media content including the transition segment is stored at the media streaming server. This can be advantageous, because the client device can simply request an appropriate transition segment to transition between the different bitrates, and is thus not required to process, calculate and otherwise determine suitable transition segments at the client end, for example based on receiving the media content in both the first and second coding modes from the media streaming server. It follows that the client device requires less computational power and bandwidth to perform the transition. In the same way, by pre-storing transition segments at the server, no transcoding or other computationally expensive processing of media segments at the server side at the time of streaming the media content are required. The transition segments can be pre-calculated, e.g. on other computation devices in a separate preparation step for the media content.

In some embodiments, the media content can comprise audio, and the coding modes can comprise at least one of stereo, multichannel sound, and immersive sound. Other types of audio coding may be possible where the transition segments comprise audio content encoded so as to smoothly transition from a first audio coding mode to a second audio coding mode. For example, the initial part of a transition segment is encoded in the first audio coding mode (e.g. multichannel) and the final part of the transition segment is encoded in the second audio coding mode (e.g. stereo). The intermediate part of the transition segment is encoded such as to provide a smooth transition between these coding modes (e.g. from multichannel to stereo).

In some embodiments, the media content can comprise video, and the coding modes can comprise at least one of 2D content, 3D content, non-virtual reality, and virtual reality. Other types of video coding may be possible where the transition segments comprise video content encoded so as to smoothly transition from a first video coding mode to a second video coding mode. For example, the initial part of a transition segment is encoded in the first video coding mode (e.g. 3D) and the final part of the transition segment is encoded in the second video coding mode (e.g. 2D). The intermediate part of the transition segment is encoded such as to provide a smooth transition between these coding modes (e.g. from 3D to 2D).

In some embodiments, a transition segment is selected and prepared to enable a smooth transition between the first and second coding modes, in particular to allow a soft or smooth switching between the first and second coding modes that is less perceptually noticeable by the user at the client device end. For this purpose, the transition segment can comprise a portion of the media content encoded in a transition coding mode, wherein the transition coding mode enables a smooth and/or fading transition between the first and second coding modes.

In some embodiments, the first and second coding modes can comprise parametric data for controlling the encoding, and in the transition coding mode the parametric data is gradually changed from the parametric data of the first coding mode to parametric data of the second coding mode. More specifically, for example in the case of a transition between 3D and 2D audio or video coding modes, the parametric data of the transition segment can be gradually changed from the parametric data of the first coding mode, corresponding to the 3D audio or video coding mode, to the parametric data of the second coding mode, corresponding to the 2D audio or video coding mode, to gradually move 3D objects of the 3D coding mode to the front of a spatial space as perceived by the user.

In some embodiments, the parametric data of the video or audio codec mode of the media content encoded in the first coding mode may correspond to spatial positions of 3D objects, and the parametric data of the video or audio codec mode of the media content encoded in the second coding mode may describe corresponding object positions being projected onto a 2D plane.

In any case, the parametric data of the transition coding mode can, in some embodiments, be configured post encoding at the media streaming server end. In other words, the parametric data of the transition coding mode can be determined based on the parametric data of both the first and second coding modes, i.e. after the media content has been encoded into the first and second coding modes.

In some embodiments, the transition segment may have a starting-time-point T_1 and an end-time-point T_2 selected to match the starting-time-point and the end-time-point of the segments of the media content encoded at the first coding mode and the second coding mode before and after the transition segment.

In some embodiments, a plurality of transition segments are provided to allow different switching points between the different bitrates of the media content. For example, the transition segments can be arranged to provide a plurality of switching points between the coding modes, which can be provided at periodically or non-periodically distributed points in time. A switching point may indicate the availability of a transition segment on the server for changing between two coding modes, one coding mode applied to media segments before the transition segment and another applied after the transition segment. The switching points between different pairs of coding modes may be the same, or different switching points for switching between various coding modes may be available.

In this respect, the switching points can be selected by performing a perceptual analysis of the media content, such as to position the switching points selectively to lower or minimize their perceptual noticeability, i.e. where the switching between media segments having different bitrates can occur.

In some embodiments, the availability of switching points in the media content can be determined at the media streaming server end, and then be signaled to the client device. For example, the availability of switching points can be determined by an analysis of the media content and signaled by using a streaming manifest of the media content, in particular by using a media adaptation set. In other words, a streaming manifest comprising information about available coding modes for the media content and possible switching points between these coding modes is communicated to the client device, preferably before streaming of the media content commences. The streaming manifest may be a file that is sent to the client device, possibly upon request from the client device. The streaming manifest may be provided by the media streaming server or another server in the network. In this way, the client device receiving the media content can be informed about possible switching points, such that when the client device determines that a coding mode switch is desired, it can consult the streaming manifest to determine the next available switching point for switching between the current coding mode and the desired coding mode. The client device may accordingly request the transitioning between bitrates at a corresponding switching point, the respective request is either configured or timed to indicate the desired switching point. Alternatively, the request may simply indicate that the next possible switching point is selected.

According to an aspect, a media streaming server for adaptive streaming of media content with bitrate switching is described. In some embodiments, the media streaming server can be adapted to perform any of the above methods, wherein the respective media content is defined to comprise a plurality of consecutive media segments.

For this purpose, the media streaming server comprises a media storing unit for storing the respective media content in at least two different coding modes, in particular media segments, and for storing transition segments for transitioning between the two coding modes. As explained above, each of the two different coding modes can correspond to a different bitrate for streaming the media content.

The media streaming server comprises a transmitting unit for transmitting segments of the media content encoded in one of the coding modes. As explained above, in some embodiments, the so transmitted segments of the media content corresponding to one of the coding modes can correspond to the media content encoded in a first coding mode having a first bitrate being transmitted to a client device. The transmitting unit may furthermore transmit transition segments to the client device, the transition segments comprising media content for the respective segment encoded such as to provide a smooth transition between a previous media segment encoded in the first coding mode and a subsequent media segment encoded in a second coding mode.

The media streaming server comprises a receiving unit for receiving from the client device requests for media content, e.g. HTTP requests. The requests for media content may identify the segment's sequence number and specify the desired coding mode of a requested media segment. The receiving unit may be further adapted to receive an indication for a coding mode switch to another coding mode.

As explained above, the client device may desire to change the bitrate of the received media content to adapt to changing network conditions, for example to maintain high quality playback with fewer stalls or re-buffering events. Further, the client end may have limited bandwidth which needs to be shared with other users, and a change in bandwidth availability may require or allow a change in the received bitrate, causing the client device to issue the respective request. The indication for a coding mode switch may be an explicit request for a particular transition segment from a first coding mode to a second coding mode.

Upon receiving the indication for a coding mode switch from the client device, the media streaming server is controlled to transmit a transition segment to the client device. Subsequently, segments of the media content in the other coding mode are transmitted to the client device, preferably in response to respective requests from the client device. As explained in detail above, this allows the client device to receive a transition segment such as to perform a predetermined transition between the media content encoded in two different coding modes, rather than simply switching between the segments representing the media content encoded in different coding modes. In this way, undesired glitches or other unnatural transitions in the streamed media content, impeding the user experience, can be reduced or eliminated.

In some embodiments, the switching points can be arranged periodically or non-periodically, and can for example be selected by performing a perceptual analysis of the media content, such as to position the switching points selectively to lower or minimize their perceptual noticeability, i.e. where the switching between media segments having different bitrates occurs.

Further, the media streaming server can comprise a signaling unit to signal the availability of switching points in a streaming manifest of the media content, in particular in a media adaptation set. In this way, the client device receiving the media content can be informed about possible switching points, such that when the client device issues the above request to transition between bitrates, the respective request is either configured or timed to indicate the desired switching point. Alternatively, the request may simply indicate that the next possible switching point is selected, or directly indicate a transition segment from a first coding mode to a second coding mode. The request for a transition segment may be a HTTP request for this media segment identifying the sequence number of the segment and the 'from-to' coding modes.

According to an aspect, a media playback device for receiving adaptive streaming of media content with bitrate switching is described. In some embodiments, the media playback device can be adapted to perform the tasks of any of the client devices mentioned above, wherein the media content comprises a plurality of consecutive media segments.

For this purpose, the media playback device comprises a request transmitting unit for transmitting requests for media content and a media receiving unit for receiving requested segments of the media content encoded in one of a plurality of coding modes. As explained above, different coding modes can correspond to different bitrates for streaming the media content. The transmitting unit may send requests (such as HTTP requests) to the media streaming server for requesting media segments in a particular coding mode and for requesting transition segments for changing coding mode.

The media playback device comprises a streaming manifest receiving unit for receiving a streaming manifest of the media content indicating switching points between coding modes. The streaming manifest may be a media adaptation set that is available for the media content to define the possible streaming parameters such as the available coding modes and switching points. A switching point may indicate the availability, at the server, of a transition segment for changing between two coding modes at this particular segment in the sequence of segments for the media content.

In some embodiments, a plurality of transition segments can be arranged to allow a number of switching points in the media stream between the available bitrates of the media content. For example, the transition segments can be arranged to provide a plurality of switching points between the coding modes, which can be provided at periodically or non-periodically distributed points in time. The switching points between different pairs of coding modes may be the same. Alternatively, pairs of coding modes may have individual switching points.

The switching points can be selected by performing a perceptual analysis of the media content, such as to position the switching points selectively to lower or minimize their perceptual noticeability, i.e. where the switching between media segments having different bitrates may occur.

In any case, the availability of switching points in the media content can be provided at the media streaming server end, and then be signaled to the media playback device. For this purpose, the availability of switching points can be signaled by using the streaming manifest of the media content, in particular in a media adaptation set. In this way, the media playback device receiving the media content can use the streaming manifest receiving unit for to be informed about the possible switching points. For example, the media playback device can request the transitioning between bitrates at a particular switching point, for example by configuring or timing the request to indicate a desired switching point. Alternatively, the request may simply indicate that the next possible switching point is selected or directly specify a requested transition segment. As explained above, a coding mode switch may be desired when the network conditions such as the available bitrate between media streaming server and client device changes.

The media playback device further comprises a playback unit for playback of the received media segments, wherein the media playback device transmits a request or an indication for a coding mode switch to another coding mode if a bitrate switch is desired. As explained above, the media playback device may desire to change the bitrate of the received media content to adapt to changing network conditions, for example to maintain high quality playback with fewer stalls or re-buffering events. Further, the media playback device may have access to limited bandwidth which needs to be shared with other users, and a change in bandwidth availability may require or allow a change in the received bitrate, causing the media playback device to issue the respective request for a change in coding mode. In embodiments, the media playback device requests a transition segment from a first coding mode to a second coding mode at a selected one of the switching points.

According to an aspect, a method for adaptive streaming of media content with bitrate switching is described, wherein the media content comprises a plurality of consecutive media segments. In some embodiments, the method is performed at a media streaming server.

The method comprises determining available switching points for switching between media segments having different coding modes. In some embodiments, the switching points can be provided at periodically or non-periodically distributed points in time.

In some embodiments, the determining of available switching points comprises analyzing the media content to determine boundaries between the segments where switching of coding modes is least perceptually noticeable. The determining of available switching points can correspond to selecting the switching points such as to lower or minimize the perceptual noticeability of switching between the media segments, i.e. where the switching between bitrates occurs.

The availability of switching points in the media content can be determined at the media streaming server end by comparing the media content encoded in the two respective different coding modes. For example, the switching points can be determined by finding corresponding positions in both media segments which have similar or identical media content characteristics. For example, if a first media segment provides 3D audio or video content, whereas a second media segment provides 2D audio or video content, then a suitable switching point may be positioned at a particular boundary between these segments, where the 3D characteristics of the streamed first media segment is insignificant, i.e. when the presence of 3D objects is at minimum at the boundary between segments. In this way, the 3D to 2D switching between the media segments will be less noticeable to the user.

The method further comprises signaling the so determined availability of switching points in a streaming manifest of the media content to a client device, in particular in a media adaptation set. The client device receiving the media content can thus be informed about the available switching points, such that when the client device issues the above request to transition between bitrates, the respective request is either configured or timed to indicate the desired switching point. Alternatively, the request may simply indicate that the next possible switching point is selected.

Accordingly, the method comprises transmitting segments of the media content encoded in a first coding mode having a first bitrate to the client device, and then receiving, from the client device, a request or an indication for a coding mode switch at an available switching point to a second coding mode having a second bitrate.

Upon arriving at the switching point or in response to the indication for a coding mode switch, the method transmits segments of the media content encoded in the second coding mode to the client device, such as to perform the switching between the two bitrates, for example without transmitting an intermediate transition segment. This becomes possible as the switching points are selected such that the perceptual noticeability of switching between the coding modes is reduced. Alternatively, the method may be combined with the above concept of providing transition segments to further reduce the perceptual noticeability of switching. Of course, the method may be implemented based on HTTP requests (e.g. according to MPEG DASH).

It will be appreciated that method steps and apparatus features may be interchanged in many ways. In particular, the details of a disclosed method can be implemented as an apparatus adapted to execute some or all of the steps of the method, and vice versa, as the skilled person will appreciate. In particular, it is understood that methods according to the disclosure relate to methods of operating a respective apparatus. It is further understood that respective statements made with regard to the method likewise apply to the corresponding apparatus.

BRIEF DESCRIPTION OF THE DRAWINGS

Example embodiments of the disclosure will now be described, by way of example only, with reference to the accompanying drawings in which.

DETAILED DESCRIPTION OF THE INVENTION

As outlined above, media content can be adaptively streamed from a media streaming server to a client device, for example to a media playback device. The media content can be streamed with different bitrates, and the media playback device can requests a coding mode switch to change the bitrate.

Figure 1:
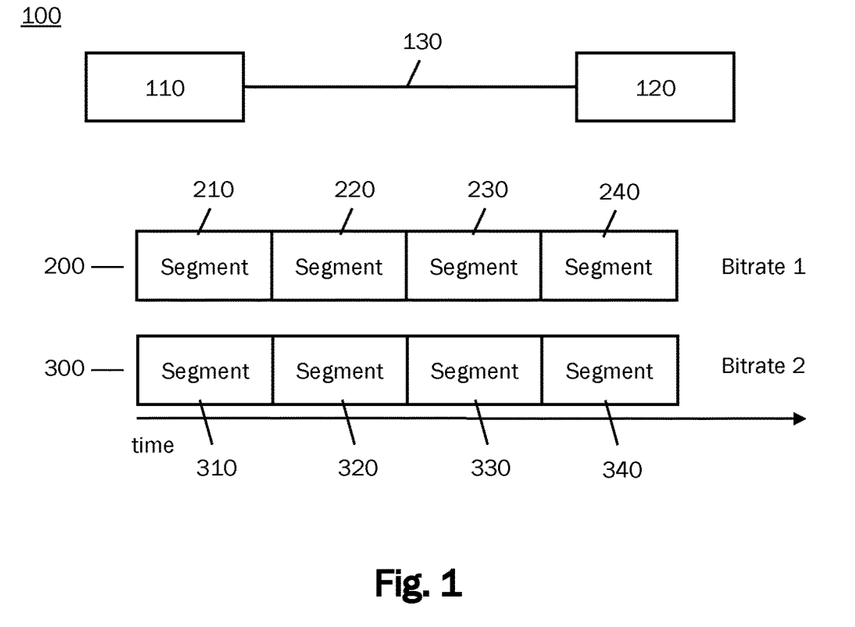
FIG. 1 shows an example of a media streaming system for adaptively streaming media content from a media streaming server to a client device.

FIG. 1 shows a corresponding media streaming system 100 wherein a media streaming server 110 and a client device 120 are coupled by a communication link 130, for example an Internet link connection. The communication link 130 can be used for providing the client device with, for example, Dynamic Adaptive Streaming over HTTP (DASH), also known as MPEG-DASH or alternatively with a HTTP Live Streaming (HLS) service. In both cases, as shown in FIG. 1, the media content 200, 300 is adaptively streamed from the media streaming server 110 to the client device 120 by breaking the media content 200, 300 into a sequence of segments 210-240, 310-340, each segment containing an interval of playback time of the media content, such as a movie or a live broadcast of a sports event.

The media content is made available for different bitrates, i.e. as a first media stream 200 having a first bitrate and at least a second media stream 300 having a second bitrate. Thus, the segments 210-240, 310-340 are encoded at different bitrates for the different media streams 200, 300. In this way, the client 120 can use a bitrate adaptation algorithm to automatically select the segment with the highest bitrate possible that can be downloaded in time for playback without causing stalls or re-buffering events in the playback.

However, switching between media content segments 210-240, 310-340 having different bitrates, i.e. at the boundaries between segments, for example to adapt to changing network conditions on the Internet link 130, can result in undesired effects which are perceivable at the client device 120 (receiver end), for example as glitches or other unnatural transitions in the streamed media content, impeding the user experience.

Figure 2:
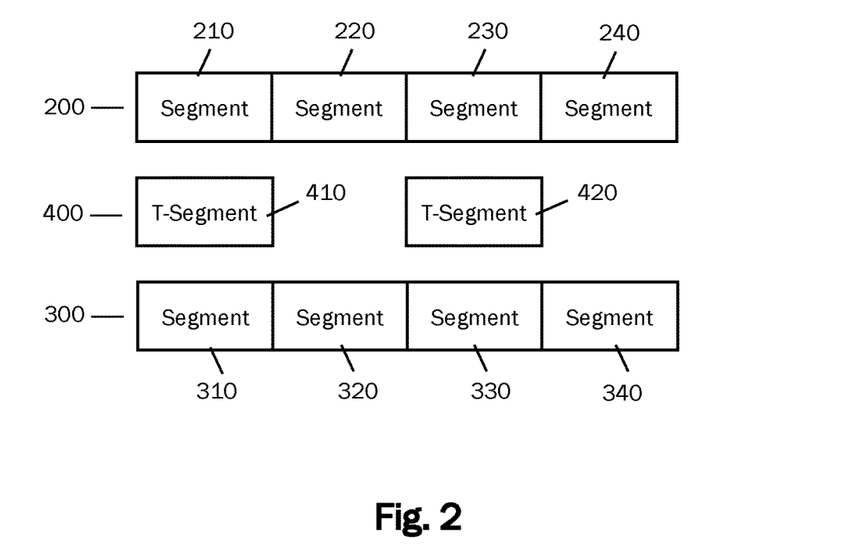
FIG. 2 shows an example of segments of media content having different bitrates and periodically distributed transition segments.

According to one or more embodiments of the present document, the adaptive streaming between the media streaming server and client device is improved by generating a plurality of transition segments 400, 410, 420 as shown in FIG. 2. More specifically, each of the transition segments 410, 420 is configured to provide a transition between two of said coding modes of the streamed media content 200, 300.

In this example embodiment, the media streaming server 110 stores the media content encoded in two different coding modes 200, 300, each corresponding to a different bitrate. Further, the media streaming server 110 also stores the transition segments 410, 420, which are arranged at different points in time to allow a transition between segments 210-240, 310-340 having differently coded media content.

The media streaming server 110 can stream the media content to the client device 120 by using the first media stream 200 corresponding to a first bitrate. In embodiments, segments of the first media stream 200 are consecutively requested by the client device 120, e.g. using HTTP get requests. Then, the client device 120 may desire to adapt to changing network conditions on the Internet link 130, for example because of users being added to or removed from the Internet link, or because they have changed their bandwidth demand, affecting the bandwidth resources available to the client device 120. In this case, the client device 120 can request the media streaming server 110 to change the coding mode of the streamed media content, i.e. to replace the streaming of the first media stream 200 (corresponding to a first bitrate) with the streaming of the second media stream 300 (corresponding to a second bitrate).

However, rather than abruptly switching between the first and second media streams 200, 300, in this embodiment the media streaming server 110 is adapted to intermediately stream one of the transition segments 410, 420 to the client device 120. Thus, the respective transition segment 410, 420 provides a transition between the streaming content encoded in the first coding mode 200 and the streaming content encoded in the second coding mode 300. In some embodiments, in FIG. 2, the media streaming server 110 may complete the streaming of a segment 220 having the first coding mode 200, followed by streaming a transition segment 420 providing a transition to the second coding mode 300, and only after completing the streaming of the transition segment 420, the media streaming server continues by streaming the respective content in the second coding mode 300 to the client, starting with the segment 340. As mentioned above, each segment (including the transition segment 420) may be individually requested by the client device using e.g. HTTP.

Figure 3:
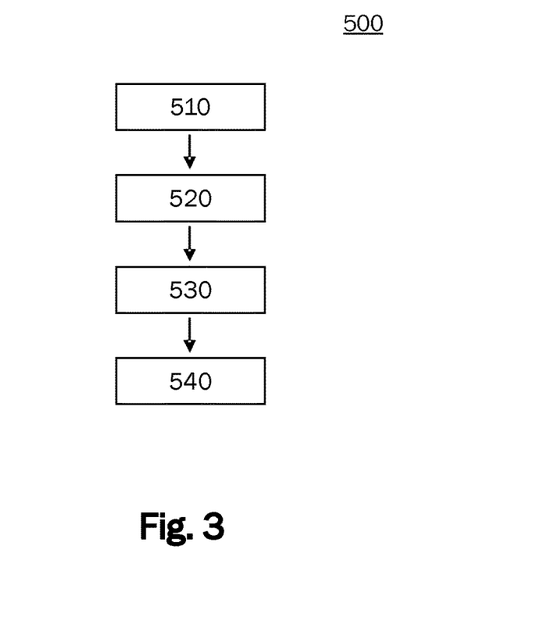
FIG. 3 shows an example of a method performed by a media streaming server.

FIG. 3 shows a corresponding method for adaptive streaming of media content with bitrate switching 500, adapted to be performed by the media streaming server 110, including the steps of: transmitting a segment of the media content encoded in a first coding mode having a first bitrate 510; receiving from the client device an indication for a coding mode switch to a second coding mode having a second bitrate 520; transmitting a transition segment for transitioning between the first coding mode and the second coding mode 530; and transmitting another segment of the media content encoded in the second coding mode 540. Again, each segment may be requested by the client device using e.g. HTTP requests and the transmissions may be in response to these requests.

In some embodiments, available switching points may be determined by analyzing the media content encoded in the first and second coding modes, such as to determine as switching points the boundaries between segments where the switching between coding modes is least perceptually noticeable.

As a result, the transmission of an intermediate transition segment may even become unnecessary, because the direct switching between coding modes 200, 300 may be insignificantly perceptually noticeable (at the so or differently selected switching points).

In this case, the method for adaptive streaming of media content with bitrate switching can skip the transmission of an intermediate transition segment, for example by performing the steps of: determining available switching points for switching of coding modes between media segments; signaling the availability of the switching points in a streaming manifest of the media content to a client device; transmitting segments of the media content encoded in a first coding mode having a first bitrate to the client device; receiving, from the client device, a request for a coding mode switch at an available switching point to a second coding mode having a second bitrate; and upon the switching point, transmitting segments of the media content encoded in the second coding mode to the client device.

In any case, with or without transmitting the intermediate transition segment, each of the coding modes 200, 300 can correspond to a different streaming bitrate of the media content. Further, the different coding modes 200, 300 can correspond to different audio or video codec modes of the media content.

In some embodiments, the different coding modes 200, 300 can correspond to audio codec modes including at least two of: stereo, 5.1 surround sound and immersive 3D audio.

In some embodiments, the different coding modes 200, 300 can correspond to video codec modes including at least two of: 2D content, 3D content, standard dynamic range (SDR), high dynamic range (HDR), virtual-reality content and non-virtual-reality content.

The transition segments 410, 420, streamed from the media streaming server 110 to the client device 120, can be configured to provide a defined transition between the streaming content encoded in the first coding mode 200 and the streaming content encoded in the second coding mode 300. For example, the transition segments 410, 420 can provide a smooth and/or fading transition between the first and second coding modes.

Figure 4:
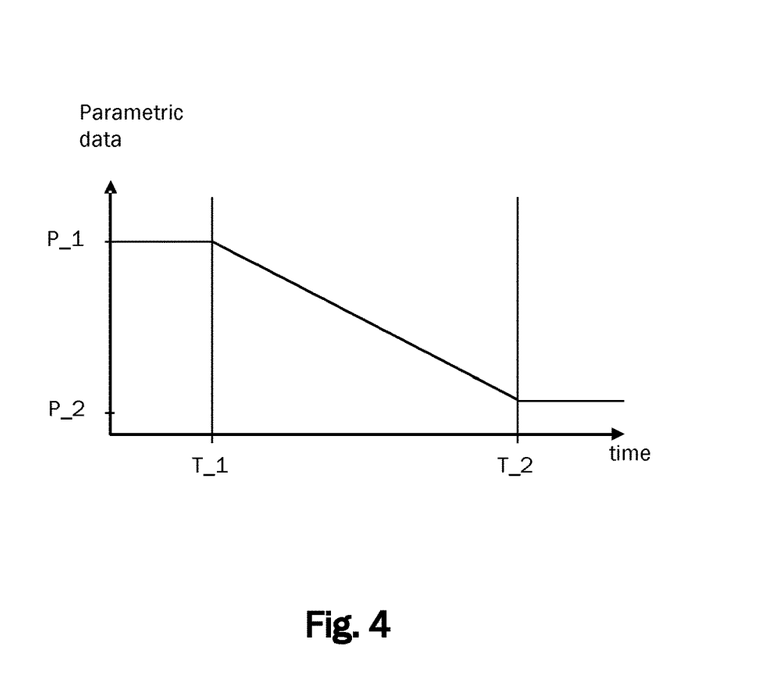
FIG. 4 shows an example of parametric data of a transition coding mode corresponding to a transition segment.

FIG. 4 shows a corresponding transition performed by a transition segment. In this example embodiment, the transition segment is shown to have a starting-time-point T_1 and an end-time-point T_2. As shown in FIG. 2, the starting- and end-time-points of transitions segments 410, 420 are selected to match the starting- and end-time-points of segments 210-240, 310-340 of the streamed media content 200, 300 before and after the transition segment.

In FIG. 4, the transition segment is shown to provide a gradual and smooth transition between a parametric data P_1 corresponding to the coding mode of a first streaming segment, to a parametric data P_2 corresponding to the coding mode of a second streaming segment. In this context, the first and second coding modes comprise parametric data P_1, P_2 for controlling the encoding, and during the transition segment the parametric data is gradually changed from the parametric data P_1 of the first coding mode to the parametric data P_2 of the second coding mode. In other words, the parametric data P_1 and P_2 correspond to parametric data of the audio or video codec modes (audio or video codec) the respective media content is encoded in as described above. Respective examples of parametric data are further described below.

In some embodiments, the transition segment 410, 420 can be generated to provide a smooth and/or fading transition between 3D and 2D audio or video codec modes, or vice-versa. In the example shown in FIG. 4, the parametric data P_1 can correspond to spatial positions of 3D objects being used for generating the coding mode of a first streaming segment, whereas the parametric data P_2 can describe corresponding object positions being projected onto a 2D plane, representing 2D objects corresponding to the coding mode of a second streaming segment. Thus, during the streaming of the transition segment 410, 420, the 3D objects of the 3D coding mode can be gradually moved towards the front of a 2D spatial space, as perceived by a user, for example a user viewing a projected 2D video. Another possible example would be moving from 5.1 (surround sound) to stereo. In this case the transition segment will, over the duration of the segment fade out the surround and center channels and—in parallel-mix the signal to left and right. This example is equally applicable when moving from an immersive channel based signal (audio with height channels) to surround sound or stereo.

Another example would be moving from 3D immersive audio representation to surround sound. In 3D immersive audio, audio is represented as individual audio objects with metadata describing their position and movement in 3D space. During transition from this representation to surround sound a transition segment (still using the 3D audio coding mode) may either slowly move an object to the position of a speaker where it will be located going forward. If the object is located between two speaker positions it may also be split up and parts of the signal are moved to the respective speaker position before switching to the surround sound encoding mode. This example is equally applicable switching from 3D immersive audio to stereo.

It follows that a smooth and controlled transition is provided between segments representing the media content encoded in different coding modes, which can be used for reducing or eliminating undesired switching effects, for example glitches or other unnatural transitions in the streamed media content.

In this example embodiment, the parametric data of the transition coding mode has been configured post encoding, i.e. generated based on the P_1 and P_2 parametric data of the encoded media content 200, 300.

As shown in FIG. 2, the positions of the transition segments 410, 420 can be arranged equidistantly, wherein the starting-time-points of transition segments are selected to occur periodically with a fixed interval. For example, the transition segments can be arranged to occur every: second, fourth, tenth or fiftieth segment of the streaming media content, for example depending on predicted fluctuations in available bandwidth resources in the communication link 130, coupling the media streaming server 110 and client device 120.

Figure 5:
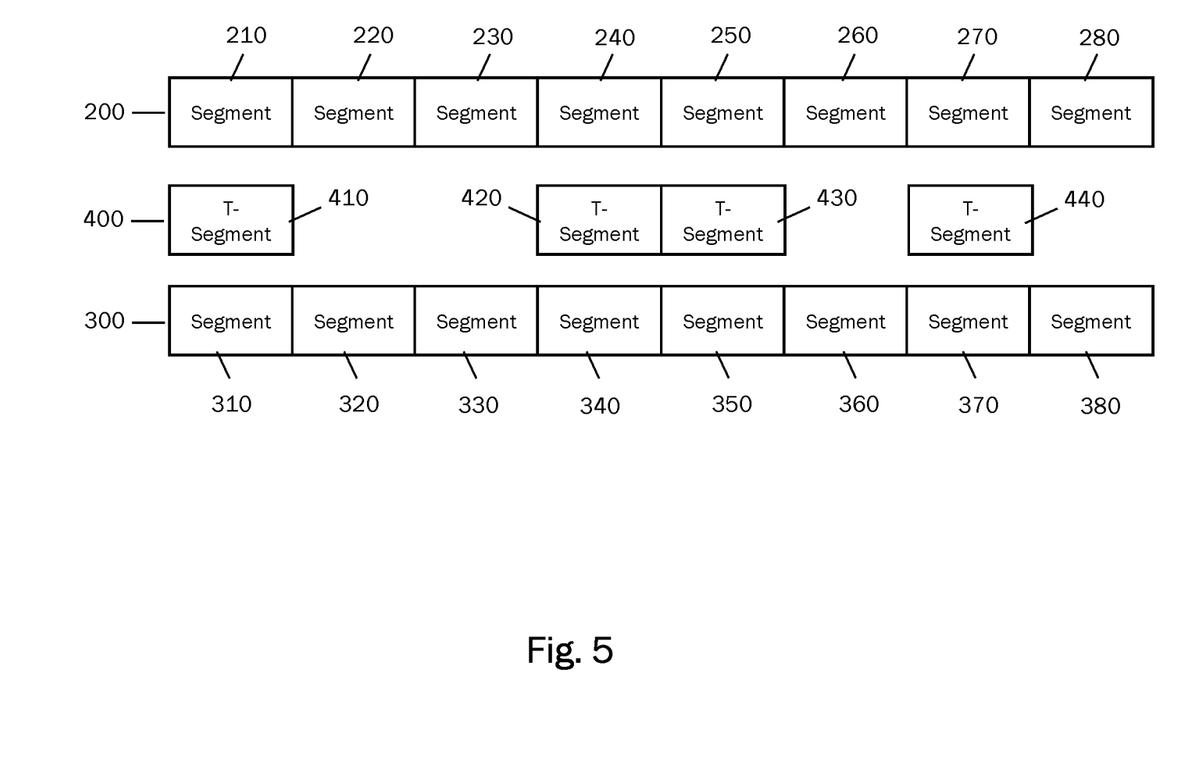
FIG. 5 shows an example of segments of media content having different bitrates and non-periodically distributed transition segments.

Alternatively, the switching points can be arranged non-periodically, such as for example shown in FIG. 5. The switching points of transition segments 410-440 arranged in a non-periodic sequence 400 can for example be selected by performing a perceptual analysis of the media content 210-280, 310-380. In this way, the position of switching points can be selected to lower or minimize their perceptual noticeability, i.e. where the switching between bitrates occurs.

In some embodiments, the perceptual analysis of the media content includes determining the switching points by finding positions in both media segments 210-280, 310-380 (being transitioned between) which have similar or identical media content characteristics. For example, if the first media segment 210-280 provides 3D audio or video content, whereas the second media segment 210-280 provides 2D audio or video content, then a suitable switching point may be positioned at the boundary between segments where the 3D characteristics of the streamed first media segment 210-280 is low or neglectable, i.e. the boundary between the segments where the presence of 3D objects corresponding to the 3D audio or video stream is at minimum.

Another example is to determine suitable switching points for switching between 5.1 and stereo. This is best done if there is silence or no signal in the surround and center channels. The same applies for switching between immersive channel based audio (height channels) and 5.1 or stereo. Similarly, switching between immersive 3d audio and 5.1 or stereo is best done when there are no objects in height (i.e. when switching to 5.1) or in height and the surrounds (i.e. when switching to stereo).

In any case, the starting-time-points of transition segments can be selected to reduce or minimize the risk of the user perceiving the transition between the first and second coding modes.

Thus, the switching points of the transition segments can be determined based on a comparison of the streaming media content encoded in the first coding mode 200 and the streaming media content encoded in the second coding mode 300.

The client device 120 can be informed about the determined switching points of the transition segments 410, 420. This information allows the client device 120 to select and request a transition at an available switching point. For this purpose, the media streaming server 110 can signal information about the switching points to the client device 120.

In some embodiments, the signaling of information about the switching points of transition segments is performed by using a streaming manifest of the media content, in particular in a media adaptation set, for example by using communication channels provided in MPEG-DASH and/or Apple-HLS protocols.

This provides robust and efficient means for conveying the information about switching points from the media streaming server 110 to the client device 120, for example by embedding such information in communication channels provided by conventional protocols. In this respect, in some embodiments, an existing adaptation set may have the following entries:

```
<AdaptationSet>
    <Representation id="1" bandwidth="128000"/>
    <Representation id="2" bandwidth="64000"/>
    <Representation id="3" bandwidth="128000"/>
</AdaptationSet>
```

Further elements can be added to describe the transition segment switching points which are selectable by the client device, for example by adding:

```
<Transition id="1" type="periodic" interval="10" switch-from-id="1" switch-to-id="2"/>
```

For example, in the case of utilizing a HTTP transfer scheme, a name template may be provided to enable segment name resolution in the client for requesting the HTTP transfer. For this purpose, the following line in the adaptation set informs the client that transition segments have a duration of 2000 milliseconds and can be found in a folder stored in memory of the HTTP server using a path/file nomenclature constructed from the variables switch-from-id and switch-to-id. In this example, the segment file names are constructed using a prefix "tseg"—and a postfix ".m4s" and use the same running number as the regular segments.

```
<TransitionSegmentTemplate duration="2000" media="$switch-from-id"$"switch-to-id"/tseg-$Numbers$.m4s">
```

So a possible example for the folder structure assuming the two lines above is:

```
12/tseg-0.m4s
12/tseg-10.m4s
12/tseg-20.m4s
...
```

In this way, the client devices can switch from representation ID 1 to 2, corresponding to the above defined two different bandwidths (bitrates), every 10th segment of the streamed media content. For this purpose, a client device simply requests and receives (downloads) the desired transition segment stored at the corresponding position in the HTTP server folder structure.

More specifically, if the media streaming server represents an HTTP server, the HTTP server stores the media content in at least two different coding modes, as well as transition segments allowing a transition between the different coding modes. In this way, the client devices can download segments for streaming the media content in any of the coding modes, and to transition between the different coding modes, if desired. The HTTP server stores the different segments using a path- and/or file nomenclature folder structure, allowing the client server to access the desired segment by requesting the corresponding file at a corresponding location in the folder tree structure, i.e. to download the corresponding desired segment.

In this context, as will be appreciated by the person skilled in the art, when the client device requests a particular segment from the HTTP server, such a request corresponds to the client device attempting to access a respective folder and/or file in said folder tree structure, as stored in memory of the HTTP server media streaming server. In case the client device successfully accesses and downloads the desired segment from the respective position in the folder tree structure, the HTTP server media streaming server is considered to have handled the client device request successfully, i.e. the HTTP server media streaming server has responded to the request by providing the desired segment content to the client device.

Figure 6:
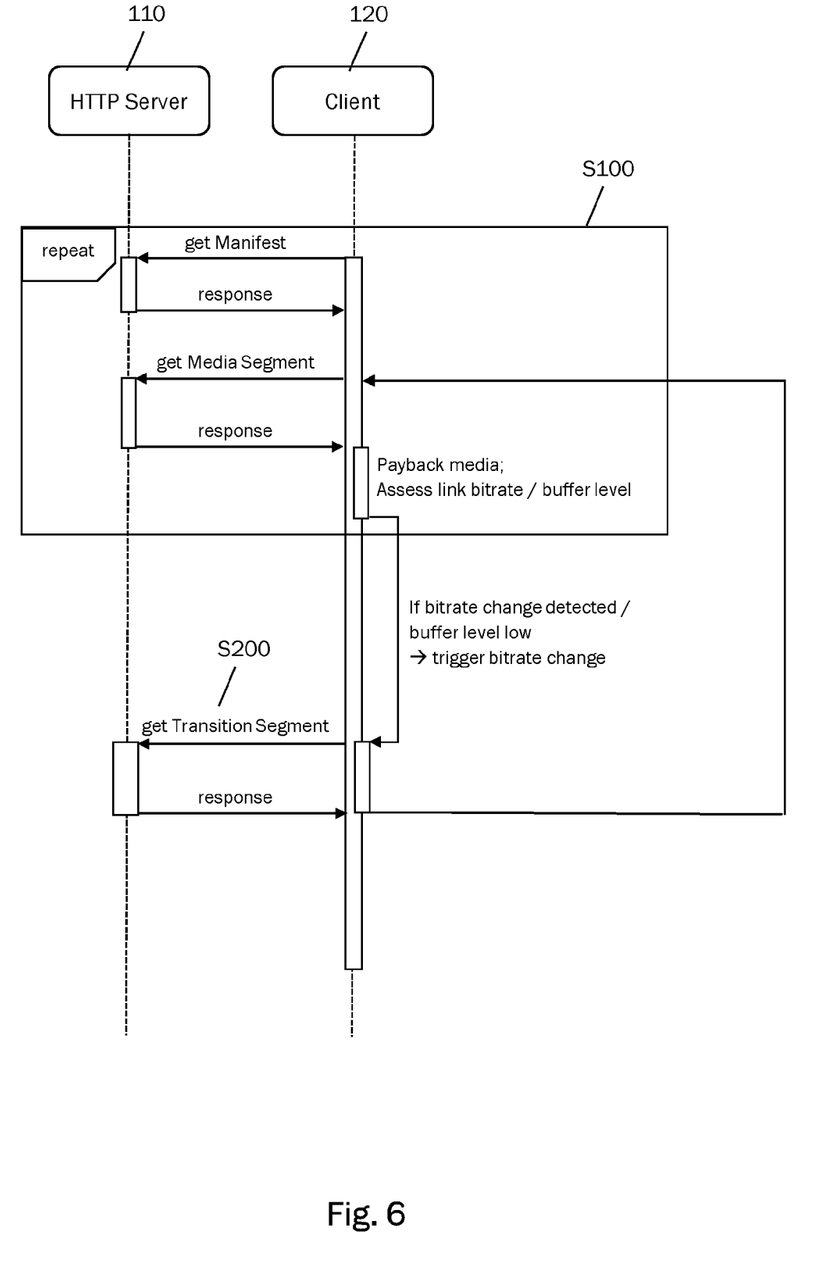
FIG. 6 shows a "HTTP server-client" arrangement.

For example, as shown in the "HTTP server-client" constellation of FIG. 6, see the "repeat step" 5100, the client device 120 requests information about switching points of transition segments by sending a "get Manifest" request to download the respective streaming manifest from the HTTP server 110. Similarly, also in the in the "repeat step" 5100, the client device 120 requests media segments encoded in a first coding mode, i.e. by sending a "get Media Segment" request to download the media segments from the HTTP server 110. As indicated in FIG. 6, the so downloaded media segments, via respective responses from the server, are added to a buffer and used as playback media in the client device 120.

In the example of FIG. 6, the streaming manifest is arranged within the repeat loop and retrieved in periodic intervals. In some cases it is not needed that the manifest is received multiple times. These two options usually depend on the use case:

(1) In cases where the content is completely available at the time the client accesses it, a periodic download of the manifest is not required and a single retrieval of the manifest before the media segments are accessed is sufficient. This is the case for video on demand (e.g. Netflix). Thus, in embodiments, the "get Manifest" request and respective response may be arranged outside of the repeat loop.

(2) In cases where the content is not completely available at the time of client access, the manifest may be periodically updated by the server and periodically retrieved by the client as shown in FIG. 6. This is the case in live streaming (i.e. a soccer match) where e.g. the total length and other parameters of the content are not known in advance.

After retrieval, the received manifest information is stored in the memory of the client, and replaced when retrieving a new manifest as per case (2). Further, if the manifest is retrieved periodically, it is typically not transmitted with every media segment but at a lower rate, e.g. only with every Nth media segment.

Then, if the client device 120 decides that a bitrate change is expedient, for example because the buffer level is running low as indicated in FIG. 6, the client device 120 proceeds to request a transition segment (i.e. for transitioning between the different coding modes corresponding to the different bitrates) by sending a "get Transition Segment" request to download the transition segment from the HTTP server 110. In other words, the client device requests the transition between bitrates as explained above, namely by downloading the desired transition segment from the respective position in the HTTP server 110 folder tree structure. If the download process is successful (via a respective response from the server), the transition segment is shown in FIG. 6 to be added to the playback media, for example by being included into the respective buffer. The client device 120 then requests media segments encoded in the second coding mode, i.e. by sending "get Media Segment" requests to download the media segments from the HTTP server 110, such as to complete the transition from the first to the second bitrate, and the to continue streaming the media content in the second coding mode.

In an example, the reverse order of the transition may be indicated in the streaming manifest to be perceptually seamless at any switching point by adding:

<Transition id="2" type="always" switch-from-id="2" switch-to-id="1"/>

Hence, the client device is informed that the reverse switching between different bitrates, i.e. from representation ID 2 to 1, is always applicable.

In some embodiments, to signal the available switching points for a non-periodic transition between the representations ID 2 to 3, the following entry can be added:

```
<Transition id="3" type="non-periodic" switch-from-id="2" switch-to-
    id="3">
    <Segment id=2/>
    <Segment id=17/>
    <Segment id=270/>
    <Segment id=450/>
    <Segment id=674/>
</Transition>
```

Here, the entry "Segment id" indicates the available switching point positions of transition segments, for example as an index corresponding to a count of streamed media content segments.

In some embodiments, the complete set of available switching points can be combined in the single adaptation set:

```
<AdaptationSet>
    <Representation id="1" bandwidth="128000"/>
    <Representation id="2" bandwidth="64000"/>
    <Representation id="3" bandwidth="128000"/>
    <Transition id="1" type="periodic" interval="10" switch-from-id="1"
        switch-to-id="2"/>
    <Transition id="2" type="always" switch-from-id="2" switch-to-
        id="1"/>
    <Transition id="3" type="non-periodic" switch-from-id="2"
        switch-to-id="3">
        <Segment id=2/>
        <Segment id=17/>
        <Segment id=270/>
        <Segment id=450/>
        <Segment id=674/>
    </Transition>
</AdaptationSet>
```

Figure 7:
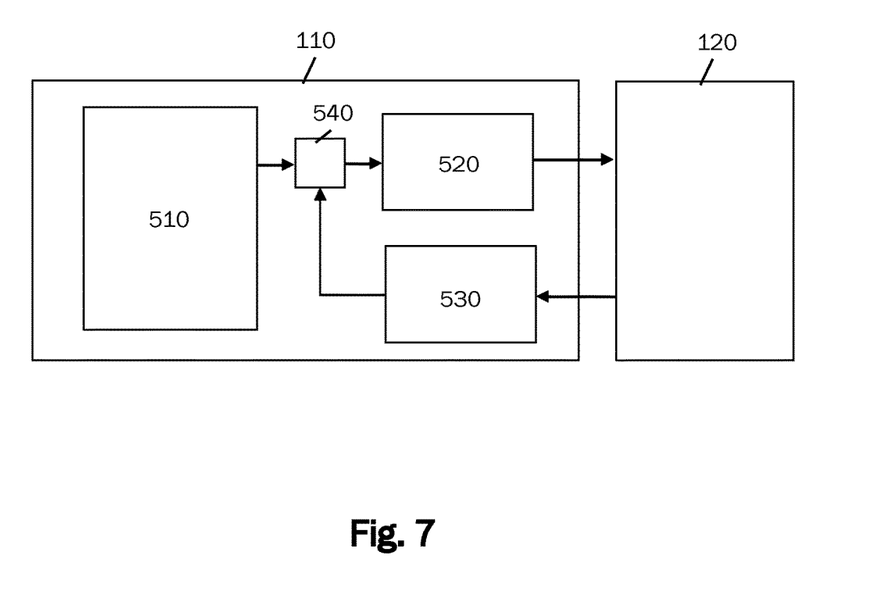
FIG. 7 shows an example of a media streaming server.

FIG. 7 shows an example embodiment of a media streaming server 110 adapted to perform the above methods, i.e. the above described tasks of a media streaming server, in particular the method shown in FIG. 3.

For this purpose, the media streaming server 110 includes a media storing unit 510 for storing said media content 200, 300 in at least 2 coding modes and for storing transition segments 400 for transitioning between the coding modes.

The media streaming server 110 further comprises a transmitting unit 520 for transmitting segments 210-280, 310,380 of the media content encoded in one of the coding modes 200, 300, and also for transmitting said transition segments 400.

A receiving unit 530 of the media streaming server 110 is configured to receive from a client device 120 requests for media segments and an indication for a coding mode switch to another coding mode. Upon receiving requests for media segments in an indicated coding mode, the media streaming server 110 transmits these requested media segments to the client device.

A control unit 540 of the media streaming server 110 is adapted to control the transmitting unit 520, such that upon receiving the indication for a coding mode switch from the client device 120, the transmitting unit 520 transmits a corresponding transition segment 410-440, and then subsequently transmits segments of the media content in the another coding mode 210-280, 310-380. In embodiments, an indication for a coding mode switch directly references a transition segment that in response is transmitted to the client device. Subsequent requests for media segments refer to segments encoded in the another coding mode.

In some embodiments, the media streaming server 110 can also comprise a signaling unit, not shown in FIG. 7, to signal the availability of switching points in a streaming manifest of the media content, in particular in a media adaptation set, as described above.

Figure 8:
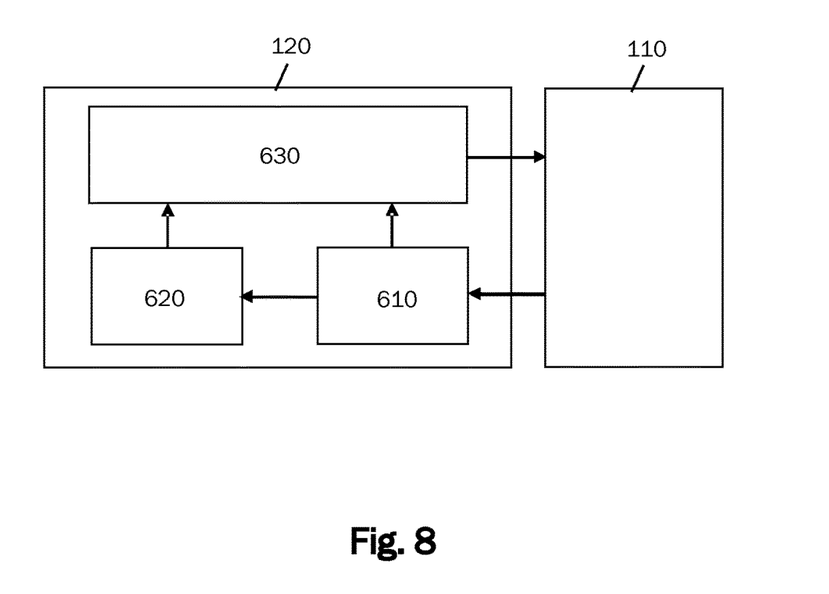
FIG. 8 shows an example of a media playback device.

FIG. 8 shows an example embodiment of a client device 120 adapted to perform the above methods, i.e. the above described tasks of a client device 120.

In this example embodiment, the client device corresponds to a media playback device 120 for receiving adaptive streaming of media content with bitrate switching, and for performing a playback of the received media content.

For this purpose, the media playback device 120 comprises a media receiving unit 610 for receiving from the media streaming server 110, segments of the media content encoded in one of a plurality of coding modes 200, 300. The media playback device 120 further comprises a request transmitting unit for transmitting requests for media content such as requests for media segments and transition segments.

A streaming manifest receiving unit 620 of the media playback device 120 receives a streaming manifest of the media content indicating the above discussed switching points between coding modes 200, 300.

The media playback device 120 further comprises a playback unit 630 for playback of the received media segments 200, 300, 400, wherein the media playback device 630 transmits an indication for a coding mode switch to another coding mode 200, 300, if a bitrate switch is desired.

The transmission and receiving units of the media streaming server 110 and the media playback device 120 may be configured to operate according to the protocols of the communication network that links the media streaming server 110 and the media playback device 120, e.g. the Internet.

The features described in herein can be relevant to one or more embodiments in any combination. Reference numerals in claims, if any, have merely been introduced to facilitate reading of the claims. They are by no means meant to be limiting.

Throughout this specification various embodiments have been discussed. However, it should be understood that the invention is not limited to any one of these. It is therefore intended that the foregoing detailed description be regarded as illustrative rather than limiting.

It will be understood that the steps of methods discussed are not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):
1. Method for adaptive streaming of media content with bitrate switching, the media content comprising a plurality of consecutive media segments, the method comprising, at a media streaming server:
   transmitting a segment of the media content encoded in a first coding mode having a first bitrate;
   receiving from a client device an indication for a coding mode switch to a second coding mode having a second bitrate and in response transmitting a transition segment for transitioning between the first coding mode and the second coding mode; and
   transmitting another segment of the media content encoded in the second coding mode.
2. Method of EEE 1, wherein the segments of the media content are transmitted in response to a request from the client device, in particular a HTTP request.
3. Method of EEE 1 or 2, wherein the indication for a coding mode switch comprises a request for a transition segment, in particular a HTTP request.
4. Method of any previous EEE, wherein the transition segment comprises a portion of the media content encoded in a transition coding mode, the transition coding mode enabling a smooth transition between the first and second coding mode.
5. Method of EEE 4, wherein the first and second coding modes comprise parametric data for controlling the encoding, and wherein in the transition coding mode the parametric data is gradually changed from the parametric data of the first coding mode to parametric data of the second coding mode.
6. Method of EEE 5, wherein the parametric data of the transition coding mode is configured post encoding.
7. Method of any previous EEE, wherein the media content including the transition segment is stored at the media streaming server.
8. Method of any previous EEE, wherein a plurality of periodic transition segments for the media content is provided.
9. Method of any previous EEE, wherein switching points between coding modes are provided periodically or non-periodically.

10. Method of any previous EEE, comprising a perceptual analysis of the media content to select switching points at least perceptually noticeable positions in media segments.

11. Method of any previous EEE, wherein the availability of switching points in the media content is signaled to a client device.

12. Method of EEE 11, wherein the availability of switching points is signaled in a streaming manifest of the media content, in particular in a media adaptation set.

13. Method of any previous EEE, wherein the media content comprises audio and the coding modes comprise at least one of stereo, multichannel sound, and immersive sound.

14. Method of any previous EEE, wherein the media content comprises video and the coding modes comprise at least one of 2D content, 3D content, non-virtual reality, and virtual reality.

15. Media streaming server for adaptive streaming of media content with bitrate switching, the media content comprising a plurality of consecutive media segments, the media streaming server comprising:
    a media storing unit for storing the media content in at least 2 coding modes and for storing transition segments for transitioning between coding modes;
    a transmitting unit for transmitting segments of the media content encoded in one of the coding modes and for transmitting transition segments;
    a receiving unit for receiving from a client device requests for media content;
    wherein, upon receiving from the client device an indication for a coding mode switch to another coding mode, the media streaming server transmits a transition segment to the client device.

16. Media streaming server of EEE 15, further comprising a signaling unit to signal to the client device the availability of switching points in a streaming manifest of the media content, in particular in a media adaptation set.

17. Media playback device for receiving adaptive streaming of media content with bitrate switching, the media content comprising a plurality of consecutive media segments, the media playback device comprising:
    a request transmitting unit for transmitting requests for media content;
    a media receiving unit for receiving segments of the media content encoded in one of a plurality of coding modes;
    a streaming manifest receiving unit for receiving a streaming manifest of the media content indicating available switching points between coding modes; and
    a playback unit for playback of the received media segments,
    wherein the media playback device transmits an indication for a coding mode switch to another coding mode at an available switching point if a bitrate switch is desired.

18. Method for adaptive streaming of media content with bitrate switching, the media content comprising a plurality of consecutive media segments, the method comprising, at a media streaming server:
    determining available switching points for switching of coding modes between media segments;
    signaling the availability of the switching points in a streaming manifest of the media content to a client device;
    transmitting segments of the media content encoded in a first coding mode having a first bitrate to the client device; and
    receiving, from the client device, an indication for a coding mode switch at an available switching point to a second coding mode having a second bitrate and in response transmitting segments of the media content encoded in the second coding mode to the client device.

19. Method of EEE 18, wherein the determining of available switching points comprises analyzing the media content to determine boundaries between segments where switching of coding modes is least perceptually noticeable.

The invention claimed is:

1. Method for adaptive streaming of media content with bitrate switching, the media content comprising a plurality of consecutive media segments, the method comprising, at a media streaming server:
    transmitting a segment of the media content encoded in a first coding mode having a first bitrate;
    receiving from a client device an indication for a coding mode switch to a second coding mode having a second bitrate, the second bitrate being different from the first bitrate, and in response transmitting a transition segment for transitioning between the first coding mode and the second coding mode, wherein the transition segment comprises a portion of the media content encoded in a transition coding mode, the transition coding mode enabling a smooth transition between the first and second coding mode; and
    transmitting another segment of the media content encoded in the second coding mode;
    wherein the media content comprises audio or video content, and wherein the first coding mode corresponds to a first audio or video codec mode of the media content and the second coding mode corresponds to a second audio or video codec mode of the media content, the second audio or video codec mode being different from the first audio or video codec mode,
    wherein the first and second coding modes comprise parametric data for controlling the encoding, and wherein in the transition coding mode the parametric data is gradually changed from the parametric data of the video or audio codec mode of the media content encoded in the first coding mode to parametric data of the video or audio codec mode of the media content encoded in the second coding mode, the parametric data corresponding to parametric data of the audio or video codec mode the media content is encoded in, wherein:
    the first coding mode corresponds to a 3D video codec mode and the second coding mode corresponds to a 2D video codec mode, wherein the parametric data of the 3D video codec mode correspond to spatial positions of 3D objects used for generating the first coding mode and the parametric data of the 2D video codec mode describe corresponding object positions being projected onto a 2D plane representing 2D objects corresponding to the second coding mode, and wherein in the transition coding mode the 3D objects of the first coding mode are gradually moved towards a front of a 2D spatial space; or
    the first coding mode corresponds to an immersive 3D audio codec mode and the second coding mode corresponds to a 5.1 surround sound or stereo codec mode, wherein the parametric data of the immersive 3D audio codec mode correspond to individual audio objects with metadata indicative of their position and movement in 3D space and the parametric data of the 5.1 surround sound or stereo codec mode correspond to respective speaker positions, and wherein in the transition coding mode the audio objects are gradually moved to the respective positions of the speakers, wherein, if an audio object is located between two speaker positions, it is split up and the respective parts are moved to the respective speaker positions.

2. Method of claim 1, wherein the segments of the media content are transmitted in response to a request from the client device, in particular a HTTP request.

3. Method of claim 1, wherein the indication for a coding mode switch comprises a request for a transition segment, in particular a HTTP request.

4. Method of claim 1, wherein the transition segment has a starting-time-point T_1 and an end-time-point T_2 selected to match the starting-time-point and the end-time-point of the segments of the media content encoded at the first coding mode and the second coding mode before and after the transition segment.

5. Method of claim 1, wherein the media content including the transition segment is stored at the media streaming server.

6. Method of claim 1, wherein a plurality of periodic transition segments for the media content is provided.

7. Method of claim 1, wherein switching points between coding modes are provided periodically or non-periodically.

8. Method of claim 1, comprising a perceptual analysis of the media content to select switching points at least perceptually noticeable positions in media segments.

9. Method of claim 1, wherein the availability of switching points in the media content is signaled to a client device.

10. Method of claim 9, wherein the availability of switching points is signaled in a streaming manifest of the media content, in particular in a media adaption set.

11. Media streaming server for adaptive streaming of media content with bitrate switching, the media content comprising a plurality of consecutive media segments, the media streaming server comprising:
a media storing unit for storing the media content in at least 2 coding modes and for storing transition segments for transitioning between coding modes, wherein the media content comprises audio or video content, and wherein the at least 2 coding modes correspond to different audio or video codec modes of the media content;
a transmitting unit for transmitting segments of the media content encoded in one of the coding modes and for transmitting transition segments;
a receiving unit for receiving from a client device requests for media content;
wherein, upon receiving from the client device an indication for a coding mode switch to another coding mode, the media streaming server transmits a transition segment to the client device, wherein the transition segment comprises a portion of the media content encoded in a transition coding mode, the transition coding mode enabling a smooth transition between the coding modes,
wherein the at least 2 coding modes comprise parametric data for controlling the encoding, and wherein in the transition coding mode the parametric data is gradually changed between the coding modes, the parametric data corresponding to parametric data of the audio or video codec mode the media content is encoded in, wherein:
the first coding mode corresponds to a 3D video codec mode and the second coding mode corresponds to a 2D video codec mode, wherein the parametric data of the 3D video codec mode correspond to spatial positions of 3D objects used for generating the first coding mode and the parametric data of the 2D video codec mode describe corresponding object positions being projected onto a 2D plane representing 2D objects corresponding to the second coding mode, and wherein in the transition coding mode the 3D objects of the first coding mode are gradually moved towards a front of a 2D spatial space; or
the first coding mode corresponds to an immersive 3D audio codec mode and the second coding mode corresponds to a 5.1 surround sound or stereo codec mode, wherein the parametric data of the immersive 3D audio codec mode correspond to individual audio objects with metadata indicative of their position and movement in 3D space and the parametric data of the 5.1 surround sound or stereo codec mode correspond to respective speaker positions, and wherein in the transition coding mode the audio objects are gradually moved to the respective positions of the speakers, wherein, if an audio object is located between two speaker positions, it is split up and the respective parts are moved to the respective speaker positions.

12. Media streaming server of claim 1, further comprising a signaling unit to signal to the client device the availability of switching points in a streaming manifest of the media content, in particular in a media adaptation set.

13. Media streaming server of claim 1, wherein the transition segment has a starting-time-point T_1 and an end-time-point T_2 selected to match the starting-time-point and the end-time-point of the segments of the media content encoded at the coding modes before and after the transition segment.

14. Media playback device for receiving adaptive streaming of media content with bitrate switching, the media content comprising a plurality of consecutive media segments, the media playback device comprising:
a request transmitting unit for transmitting requests for media content;
a media receiving unit for receiving segments of the media content encoded in one of a plurality of coding modes, wherein the media content comprises audio or video content, wherein the coding modes correspond to different audio or video codec modes of the media content;
a streaming manifest receiving unit for receiving a streaming manifest of the media content indicating available switching points between a first and a second coding mode corresponding to a 3D and a 2D audio or video codec mode that had been determined, by a media streaming server, by analyzing the media content to determine boundaries between segments, such that the presence of 3D objects is at minimum where switching of coding modes is least perceptually noticeable; and
a playback unit for playback of the received media segments,
wherein the media playback device transmits an indication for a coding mode switch to another coding mode at an available switching point if a bitrate switch is desired.

15. Method for adaptive streaming of media content with bitrate switching, the media content comprising a plurality of consecutive media segments, the method comprising, at a media streaming server:
- determining available switching points for switching of coding modes between media segments by analyzing the media content to determine boundaries between segments, where switching of coding modes is least perceptually noticeable;
- signaling the availability of the switching points in a streaming manifest of the media content to a client device;
- transmitting segments of the media content encoded in a first coding mode having a first bitrate to the client device; and
- receiving, from the client device, an indication for a coding mode switch at an available switching point to a second coding mode having a second bitrate, the second bitrate being different from the first bitrate, and in response transmitting segments of the media content encoded in the second coding mode to the client device,
- wherein the media content comprises audio or video content, and wherein the first coding mode corresponds to a 3D audio or video codec mode of the media content, and the second coding mode corresponds to a 2D audio or video codec mode of the media content, and wherein the boundaries between the segments are determined such that the presence of 3D objects is at minimum.

* * * * *

UNITED STATES PATENT AND TRADEMARK OFFICE
CERTIFICATE OF CORRECTION

| | |
|---|---|
| PATENT NO. | : 11,997,339 B2 |
| APPLICATION NO. | : 17/792829 |
| DATED | : May 28, 2024 |
| INVENTOR(S) | : Malte Schmidt |

It is certified that error appears in the above-identified patent and that said Letters Patent is hereby corrected as shown below:

In the Claims

Column 22, Line 30, In Claim 12, delete "claim 1," and insert --claim 11,-- therefor Column 22, Line 34, In Claim 13, delete "claim 1," and insert --claim 11,-- therefor Signed and Sealed this
First Day of July, 2025

Coke Morgan Stewart
*Acting Director of the United States Patent and Trademark Office*